T868009

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 18, 1969

868 O.G. 731

832,247

METHOD OF MAKING PLASTIC BOOK COVERS

Robert B. Davis, 8A Mayberry Drive, Apt. 6, Westboro, Mass. 01581, and Robert B. McFall, P.O. Box 511, Kingsport, Tenn. 37662

Filed June 11, 1969. Published Nov. 18, 1969

Int. Cl. B29c *17/14;* B29f *3/01*

U.S. Cl. 264—151 3 Claims

1 Sheet Drawing. 7 Pages Specification

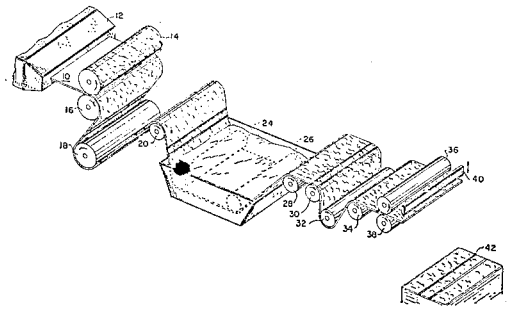

A method of making book covers from thermoplastic material by first extruding a sheet, then while the sheet is still molten, embossing one surface of the sheet with a pattern or design which includes depressed hinge lines extending in a direction across the sheet or perpendicular to the direction of extrusion, and cooling the sheet. In this manner, the molecules at the hinges are oriented during embossing across the hinges.

T868009
832247
DEF. PUB.
Nov. 18, 1969
R. B. DAVIS ET AL
METHOD OF MAKING PLASTIC BOOK COVERS
Filed June 11, 1969
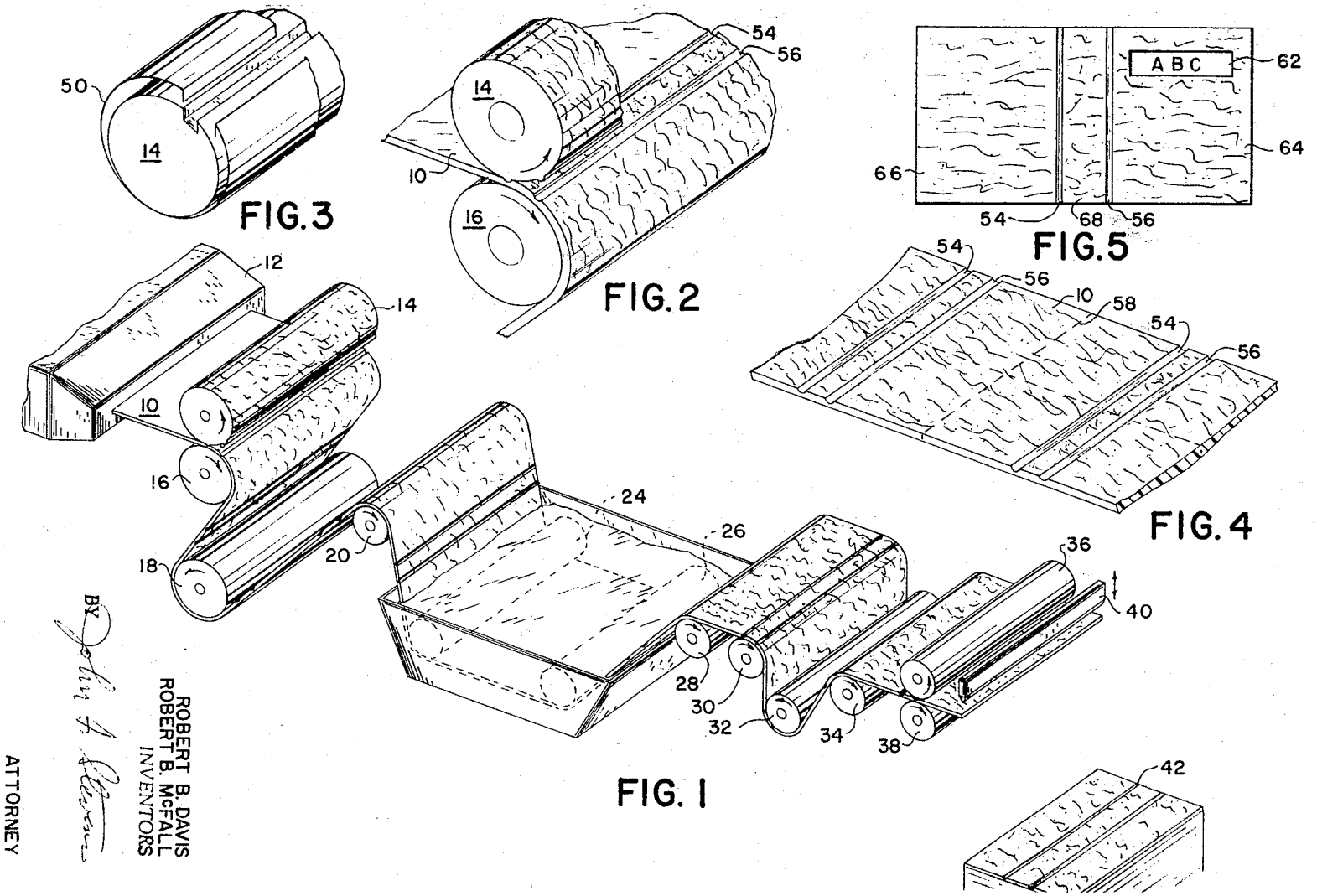
ROBERT B. DAVIS
ROBERT B. McFALL
INVENTORS
BY John A. Stevens
ATTORNEY